(12) United States Patent
Lin (10) Patent No.: US 9,629,345 B2
(45) Date of Patent: Apr. 25, 2017

(54) BIOCHEMICAL BALL

(71) Applicant: James C. Lin, Tainan (TW)

(72) Inventor: James C. Lin, Tainan (TW)

(*) Notice: Subject to any disclaimer, the term of this patent is extended or adjusted under 35 U.S.C. 154(b) by 289 days.

(21) Appl. No.: 14/598,397

(22) Filed: Jan. 16, 2015

(65) Prior Publication Data
US 2016/0000052 A1 Jan. 7, 2016

(51) Int. Cl.
*A01K 63/04* (2006.01)
*C02F 3/10* (2006.01)

(52) U.S. Cl.
CPC ............ *A01K 63/045* (2013.01); *A01K 63/04* (2013.01); *C02F 3/10* (2013.01); *C02F 3/109* (2013.01)

(58) Field of Classification Search
None
See application file for complete search history.

(56) References Cited

U.S. PATENT DOCUMENTS

| | | | | |
|---|---|---|---|---|
| 3,633,538 | A * | 1/1972 | Hoeflin | D06M 23/02 118/76 |
| 3,924,807 | A * | 12/1975 | Morgan | A24F 25/00 239/55 |
| 4,200,532 | A * | 4/1980 | Iwatani | B01J 19/30 210/151 |
| 6,631,890 | B1 * | 10/2003 | Lau | B01J 19/30 261/94 |
| 6,966,982 | B1 * | 11/2005 | Chang | A01K 63/04 119/227 |
| 8,747,532 | B2 * | 6/2014 | Chang | B01D 47/14 261/DIG. 72 |
| 2006/0011529 | A1 * | 1/2006 | Chang | A01K 63/045 210/167.22 |
| 2006/0096919 | A1 * | 5/2006 | Han | C02F 3/10 210/617 |

* cited by examiner

*Primary Examiner* — Benjamin Kurtz
(74) *Attorney, Agent, or Firm* — Rosenberg, Klein & Lee (57) ABSTRACT

A biochemical ball includes a first half, a second half, and a plurality of sponge filters. The first half has a plurality of first ribs, a first rim, and a first partition. The first partition divides the first half into a plurality of equal first accommodating spaces. The first rim of the first half is provided with a first fastener and a connecting joint. The second half has a plurality of second ribs, a second rim, and a second partition. The second partition divides the second half into a plurality of equal second accommodating spaces. The second rim of the second half is provided with a second fastener configured to correspondingly engage with the first fastener. The sponge filters are so received in the first and second accommodating spaces that the sponge filters are separated without contacting each other, thereby enhancing filtering efficiency.

12 Claims, 9 Drawing Sheets

BIOCHEMICAL BALL

BACKGROUND OF THE INVENTION

1. Technical Field

The present invention relates to supplies for aquariums, and more particularly to a biochemical ball features high efficiency for decomposition and filtration.

2. Description of Related Art

Currently, filtration practices in aquariums and aquafarms can be generally classified into two categories, namely physical filtration and biological filtration. Physical filtration is aimed at removing residual bait and fish excreta from water, and biological filtration uses biological balls or blocks to culture nitrifying bacteria that clean water. Therein, biological filtration is known to be more effective. Taiwan Patent No. M401985 published on Aug. 11, 2000 provides a biochemical brick designed for effective aeration and bacterial culture. The prior-art biochemical brick comprises a main body composed of two halves and having a biochemical sponge received therein, purporting to improve aeration, culture of nitrifying bacteria, and dissolved oxygen. The two halves each have layers of flow-guiding pieces that divide incoming flow into multiple streams of water. The two halves are fixedly combined through a connecting portion at one side and are disengagably engaged at the other side via a combination of a hook and a retaining recess so as to define therein a chamber that accommodates the biochemical sponge. The multiple streams of water achieve more dynamic water flow, thereby promoting water distribution and increasing dissolved oxygen, so as to improve aeration. The biochemical sponge contained in the chamber is prevented from compression and deformation, so as to maximize the cultured nitrifying bacteria for highly-bacterial-density filtration that effectively cleans water. The prior-art thus is claimed to have the advantages about high practicability, outstanding performance, great effectiveness and reduced costs.

However, in the prior-art biochemical brick, the main body contains only a single piece of biochemical sponge. Over long-term use, the biochemical sponge tends to have its pores clogged by filth and gradually lose oxygen exposure. Therefore, the biochemical sponge has to be cleaned or replaced regularly. The older the filtering system is the shorter interval for cleaning or replacement is. When the sponge is clogged too seriously to allow water to flow therethrough, the efficiency of nitrifying filtration is degraded and water may flood out the filter tank. This limits the application of the prior-art biochemical brick to trickle filters. In addition, since the biochemical bricks in use are stacked together, the contacting area between water and the stacked biochemical bricks is smaller as compared to the case where the biochemical bricks are placed separately.

Taiwan Patent No. M335318 published on Jul. 1, 2008 provides a composite multidimensional biochemical ball, which comprises a three-dimensionally geometric main body. The surface of the main body is at one part formed with raised lines, and at another part formed with through holes so that the main body is hollowed out. The main body is centrally provided with a tube and internally provided with braces. The braces are distributed across the inside of the main body and connected to the periphery of the tube. As claimed in the patent, such a configuration can provide biological cleaning and is useful to process industrial sewage by collecting contaminants in the main body and making water clean.

While the prior-art patent ensures fast flow through the main body and increase oxygen exposure that facilitate water cleaning by eliminating the use of biochemical sponge, there is no habitat for nitrifying bacteria to propagate, so its filtration efficiency is limited. Besides, since the known biochemical ball is only for floating use, though it is suitable for processing industrial sewage, it is not a proper approach to filtration for aquariums.

Another related prior-art patent is Taiwan Patent No. M322844 published on Dec. 1, 2007 that provides a structured filtering ball, which comprises a first filter and a second filter, each having an open end and being formed therein a first space or a second space. The first and second filters have their open ends peripherally provided with at least one connecting portion and at least one butting portion, respectively. Thereby, when the connecting portion of first filter and the butting portion of the second filter are combined, the first space and the second space are communicated with each other. When the connecting portion of the first filter and the butting portion of the second filter are separated, the first filter/second filter can be placed into the second space/first space of the second filter/first filter, so that the first filter and the second filter can be stacked into a compact structure, thereby reducing shipping volume and saving transportation costs.

Nevertheless, the prior-art patent only uses two hemispheres to compose the filtering ball, without having any biochemical sponge. Thus, it provides no aid in improving oxygen content in water and fails to facilitate culture of nitrifying bacteria and filtration. Similarly, it is only for floating use, so it is not a proper approach to filtration for aquariums.

SUMMARY OF THE INVENTION

Hence, in order to address the problems of the existing biochemical balls for filtration, the present invention provides a biochemical ball comprising a first half, a second half configured to be assembled with the first half, and a plurality of sponge filters. The first half is defined by spherically a plurality of first ribs and peripherally a first rim and has a first partition dividing the first half into a plurality of equal first accommodating spaces, in which the first rim of the first half is provided with at least one first fastener. The second half is defined by spherically a plurality of second ribs and peripherally a second rim and has a second partition dividing the second half into a plurality of equal second accommodating spaces. in which the second rim of the second half is provided with at least one second fastener that is configured to correspondingly engage with the at least one first fastener. The plurality of sponge filters are such installed in the first and second accommodating spaces that the first and second accommodating spaces are occupied by the sponge filters in an alternate manner, thereby keeping the sponge filters from being adjacent to and contacting each other.

Preferably, the first ribs are radially arranged so as to define the first half as a hollow hemisphere.

Preferably, the second ribs are radially arranged so as to define the second half as a hollow hemisphere.

Preferably, the first partition has an asterisk-like shape.

Preferably, the second partition has an asterisk-like shape.

Preferably, the first half and the second half are made of plastic through injection molding and integratedly formed as a unity.

Preferably, the first partition is formed on the first rim.

Preferably, the second partition is formed on the second half close to the second rim.

Preferably, each of the sponge filters has a bar-like structure that fits in the corresponding first or second accommodating space.

Preferably, the biochemical ball further comprises a connecting joint on the first rim of the first half for connecting the second half.

Preferably, the first half is centrally provided with a first through hole.

Preferably, the second half is centrally provided with a second through hole.

The present invention has the following advantages:

1. The disclosed biochemical ball facilitates the culture of a large amount of nitrifying bacteria in the sponge filters. As sewage adequately contact the nitrifying bacteria in the sponge filters, ammonia carried by the sewage can be completely decomposed by the nitrifying bacteria, thereby effectively cleaning the water.

2. Since the first and second accommodating spaces are occupied by the sponge filters in an alternate manner, sewage can fast flow through the first and second accommodating spaces that are not filled with the sponge filters, thereby increasing oxygen exposure of the sewage.

3. The sewage flowing fast helps to scour off filth and impurities from the sponge filters, so as to maximize cleanness of the sponge filters and prevent the sponge filters from being clogged, thereby reducing the needs of cleaning or replacing the sponge filters, and in turn saving labor and monetary costs for maintenance of aquariums.

4. The nitrifying bacteria cultured in the sponge filters also help to absorb dissolved oxygen in sewage, thereby enhancing decomposing efficiency and growth of the nitrifying bacteria and in turn improving filtration of aquafarming systems and processing systems.

5. The biochemical ball is suitable for filter tanks and aquariums using different types of filtration, and is perfect for industrial sewage processing and aquafarm filtration since it reduces the risk of getting clogged that incurs water overflow.

6. With the first through hole of the first half and the second through hole of the second half, sewage can flow through the biochemical ball fast, thereby increasing the oxygen content in sewage.

DETAILED DESCRIPTION OF THE INVENTION

Figure 1:
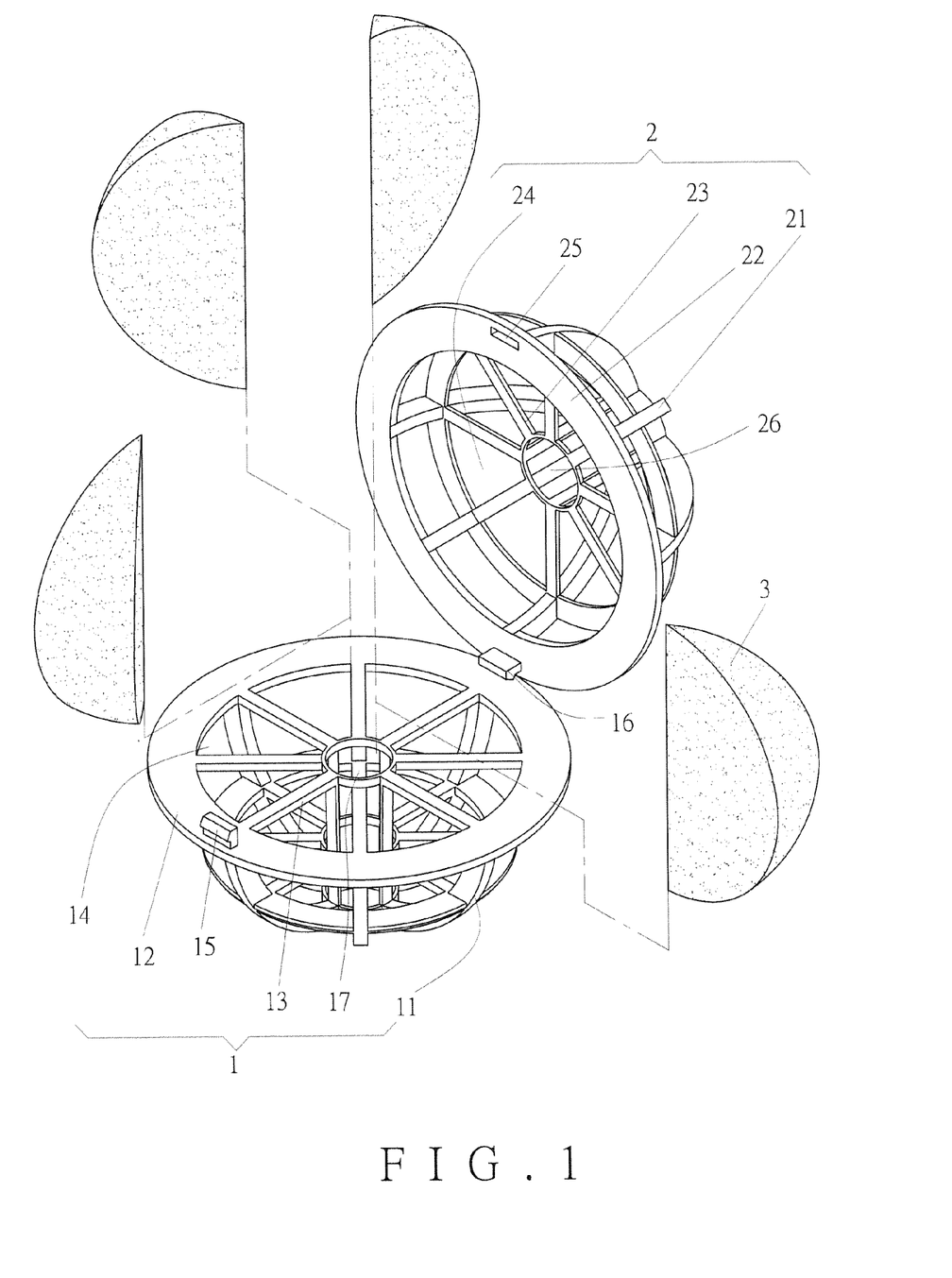
FIG. 1 is an exploded view of a biochemical ball according to one embodiment of the present invention.
Figure 2:
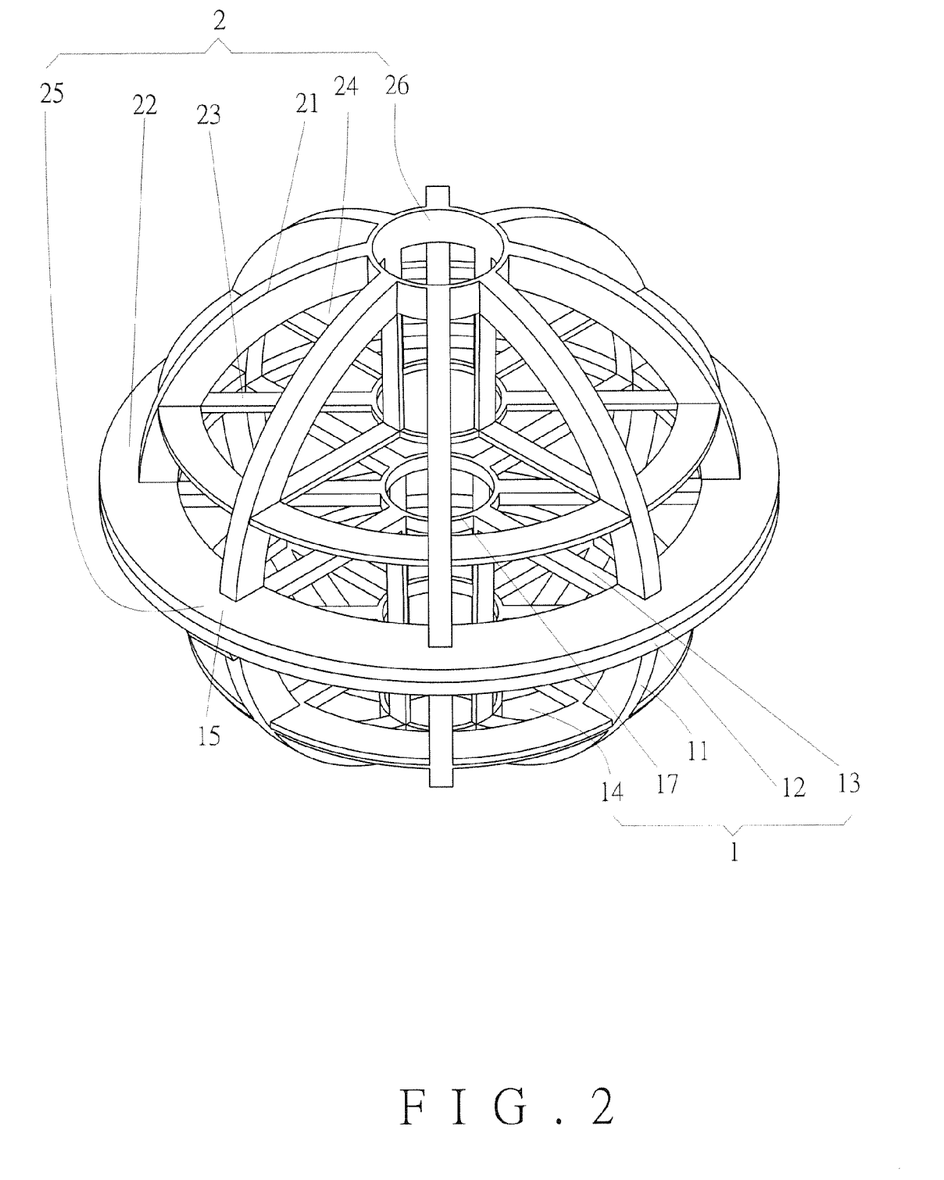
FIG. 2 is an assembled view of a first half and a second half of the biochemical ball.

Referring to FIG. 1 and FIG. 2, according to one embodiment of the present invention, a biochemical ball comprises a first half (1), a second half (2) and sponge filters (3).

The first half (1) has spherically a plurality of first ribs (11) that are radially arranged so as to define the first half (1) as a hollow hemisphere. The first half (1) has peripherally a first rim (12) on which an asterisk-like first partition (13) is formed, thereby dividing the first half (1) into eight equal first accommodating spaces (14). The first rim (12) of the first half (1) has a first fastener (15) and a connecting joint (16) that are oppositely arranged. In addition, at the center of the first half (1), there is a first through hole (17) passing through.

The second half (2) is connected to the connecting joint (16) of the first half (1). Particularly, the first half (1) and the second half (2) can be made of plastic through injection molding and integratedly formed as a unity. The second half (2) has spherically a plurality of second ribs (21) that are radially arranged so as to define the second half (2) as a hollow hemisphere. The second half (2) has peripherally a second rim (22), and an asterisk-like second partition. (23) is formed on the second half (2) close to the second rim (22), thereby dividing the second half (2) into eight equal second accommodating spaces (24). The second rim (22) of the second half (2) has a second fastener (25) configured to engage with the first fastener (15) of the first half (1). In addition, at the center of the second half (2), there is a second through hole (26) passing through.

The sponge filters (3) are made of a porous material. The sponge filter (3) has a bar-like structure that fits in the corresponding first or second accommodating space (14) or (24). There may be four said sponge filters (3) such installed in the first and second accommodating spaces (14),(24) that the first and second accommodating spaces (14),(24) are occupied by the sponge filters (3) in an alternate manner (as shown in FIG. 3), so that nitrifying bacteria can be cultured in the pores of the sponge filters (3).

Figure 3:
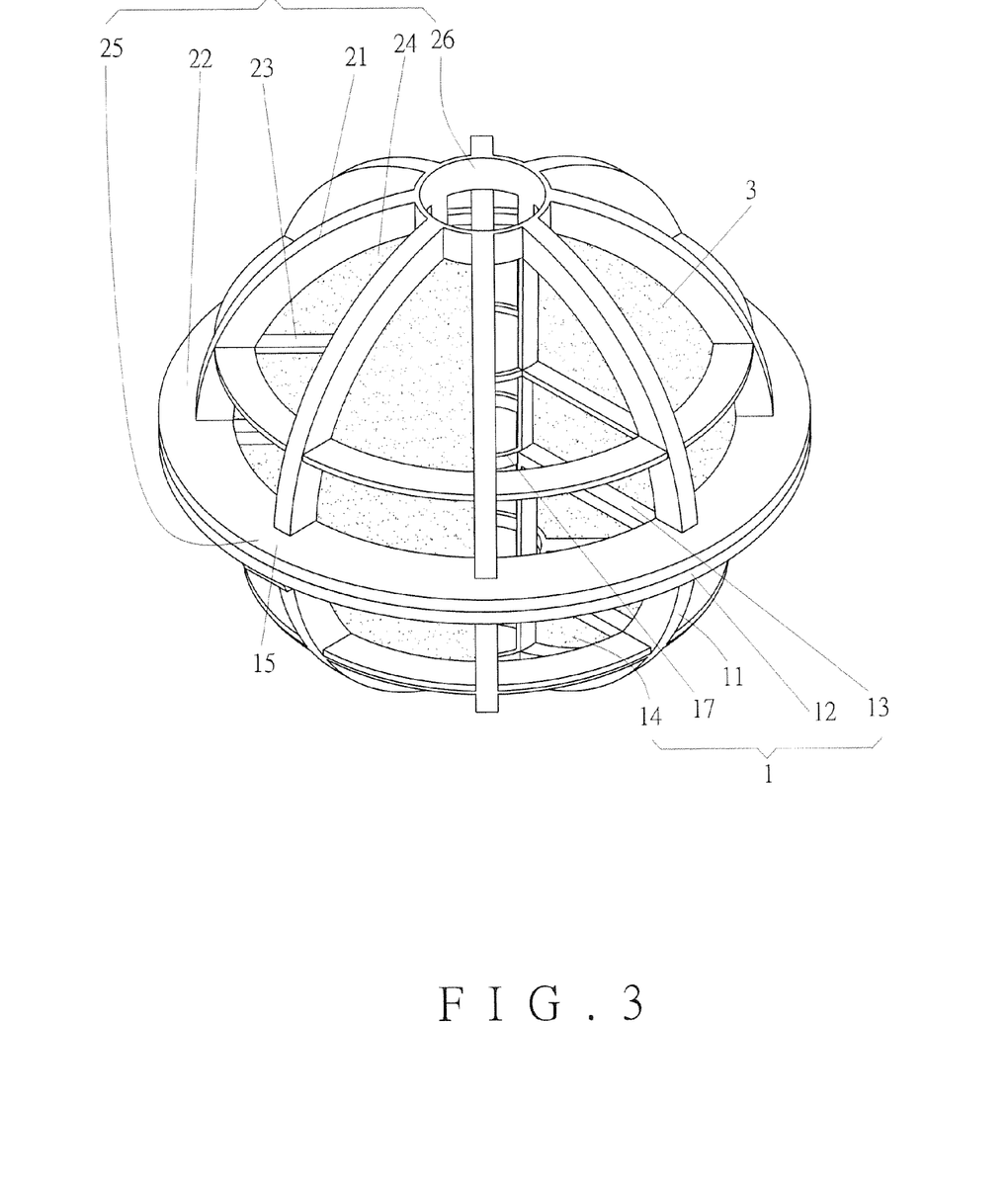
FIG. 3 is a perspective view of the biochemical ball.
Figure 4:
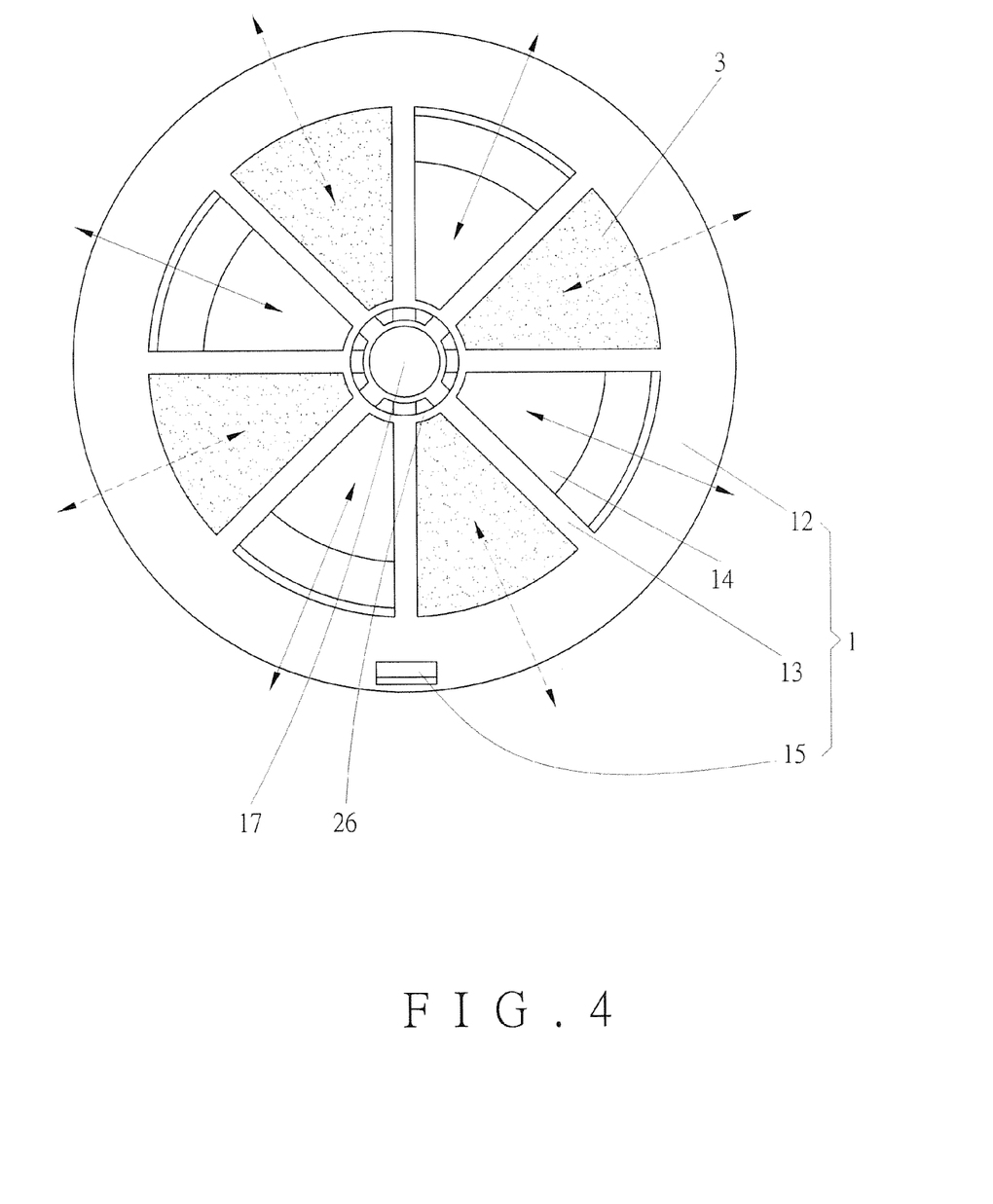
FIG. 4 is a schematic drawing showing water flowing through filters of the biochemical ball.

To assemble the biochemical ball, as shown in FIG. 3 and FIG. 4, the sponge filters (3) are placed into every other adjacent first accommodating spaces (14) and second accommodating space (24), so that the installed sponge filters (3) are not adjacent to and do not contact each other. Then the first fastener (15) of the first half (1) is engaged with the second fastener (25) of the second half (2), thereby holding the first half (1), the second half (2) and the sponge filters (3) together as a fully spherical biochemical ball. The sponge filters (3) are retained by the first ribs (11) of the first half (1) and the second ribs (21) of the second half (2) from coming off the first accommodating spaces (14) of the first half (1) and the second accommodating spaces (24) of the second half (2).

Figure 5:
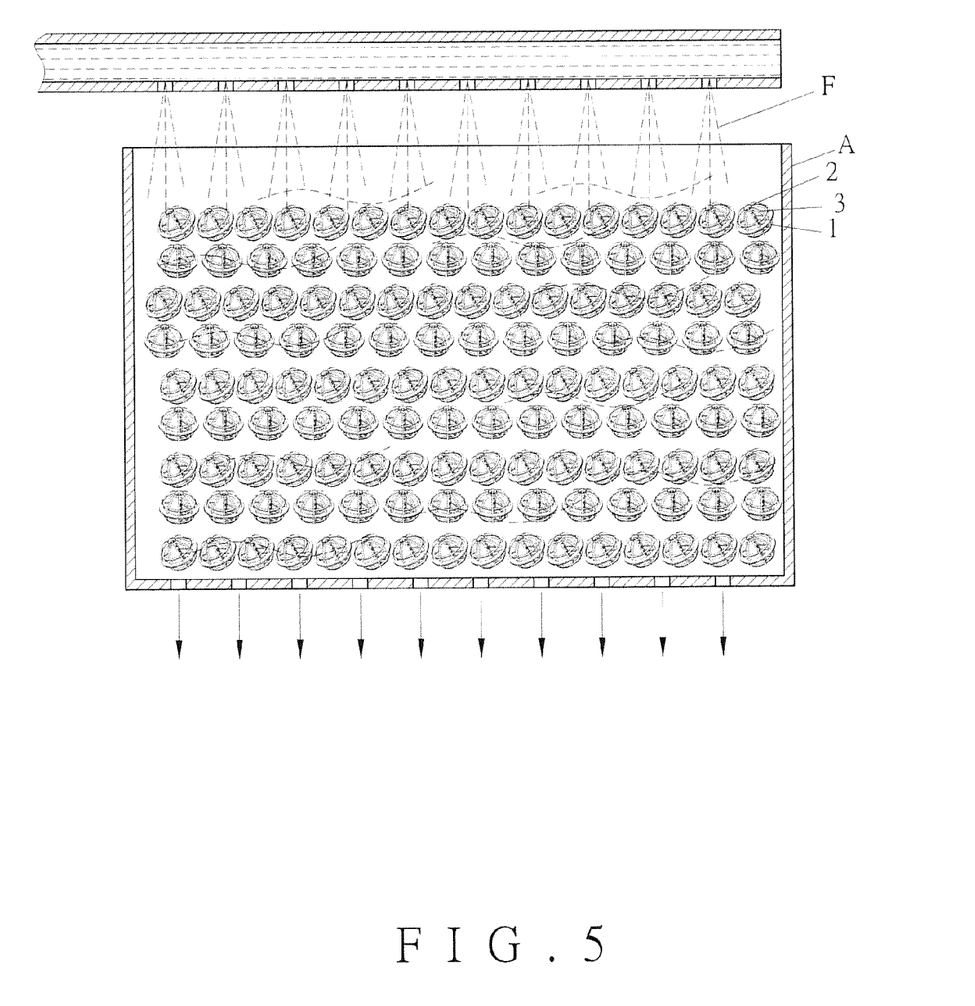
FIG. 5 illustrates a first instance where the biochemical balls of the present invention are used in a filter tank.

In use, as shown in FIG. 4 and FIG. 5, a proper amount of said biochemical balls each composed of the first half (1), the second half (2) and the sponge filters (3) is placed into a filter tank (A), and the sewage (F) to be filtered is trickled into the filter tank (A). When the sewage (F) flows through the first accommodating spaces (14) of the first half (1) and the second accommodating spaces (24) of the second half (2), a part of the sewage (F) contacts the sponge filters (3) installed in the first accommodating spaces (14) and the second accommodating spaces (24) (as indicated by the dotted lines in FIG. 4), so that the nitrifying bacteria existing in the pores of the sponge filters (3) can adequately act on the sewage (F) to completely decompose ammonia carried by the sewage (F), so as to clean water. Meanwhile, the sewage (F) flowing through the sponge filters (3) also helps to scour the sponge filters (3) and takes away the filth and impurities attached to the sponge filters (3), thereby maintaining cleanness of the sponge filters (3) and preventing them from blockade. Consequently, cleaning or replacement of the sponge filters (3) can be less frequent.

The present invention further uses the first through hole (17) of the first half (1) and the second through hole (26) of the second half (2) to ensure fast flow of the sewage (F), thereby maintain high oxygen content in the sewage (F).

A different part of the sewage (F) flows into the first accommodating spaces (14) and the second accommodating spaces (24) not occupied by the sponge filters (3) (as indicated by the solid lines in FIG. 4). Since this part of the sewage (F) encounters no obstruction, it flows fast and has greater oxygen exposure. Additionally, the fast flowing sewage (F) helps to scour the sponge filters (3) and takes away the filth and impurities attached to the sponge filters (3), thereby maintaining cleanness of the sponge filters (3) and preventing them from blockade. Consequently, cleaning or replacement of the sponge filters (3) can be less frequent and the service life of the sponge filters (3) can be lengthened. Also, the nitrifying bacteria in the sponge filters (3) can absorb the massive dissolved oxygen from the sewage (F), thereby improving their decomposition and growth The sewage (F) passing through the sponge filters (3) has ammonia contained therein adequately contacting the nitrifying bacteria in the pores of the sponge filters (3). As the nitrifying bacteria completely decompose ammonia coming with the sewage (F), water cleaning can be achieved. In this manner, filtration of aquafarming systems and processing systems for sewage (F) can be significantly improved, and the sponge filters (3) can be less replaced, thereby saving labor and monetary costs.

Figure 6:
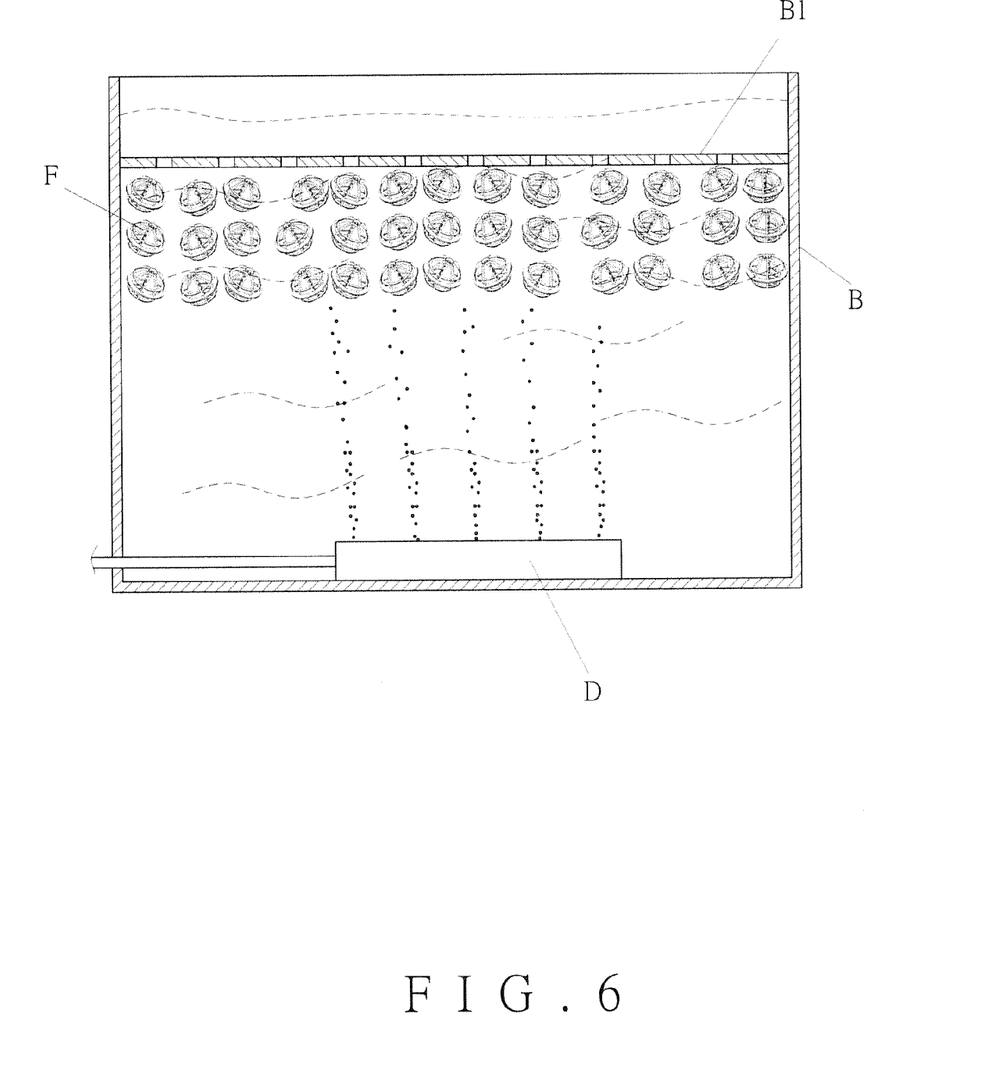
FIG. 6 illustrates a second instance where the biochemical balls of the present invention are used in a filter tank.

In addition to trickle filtration, the disclosed biochemical ball can be used in different ways. For example, plural said biochemical balls are placed in another filter tank (B) (as shown in FIG. 6), and a depressor (B1) is used to retain the biochemical balls in water. Then a bubble plate (D) works to generate strong water flow or air bubbles flush and make the biochemical balls roll in the filter tank (B). This also helps to increase dissolved oxygen in the sewage (F), thereby improving decomposing efficiency and growth of the nitrifying bacteria. In this manner, filtration of aquafarming systems and processing systems can be significantly improved.

Figure 7:
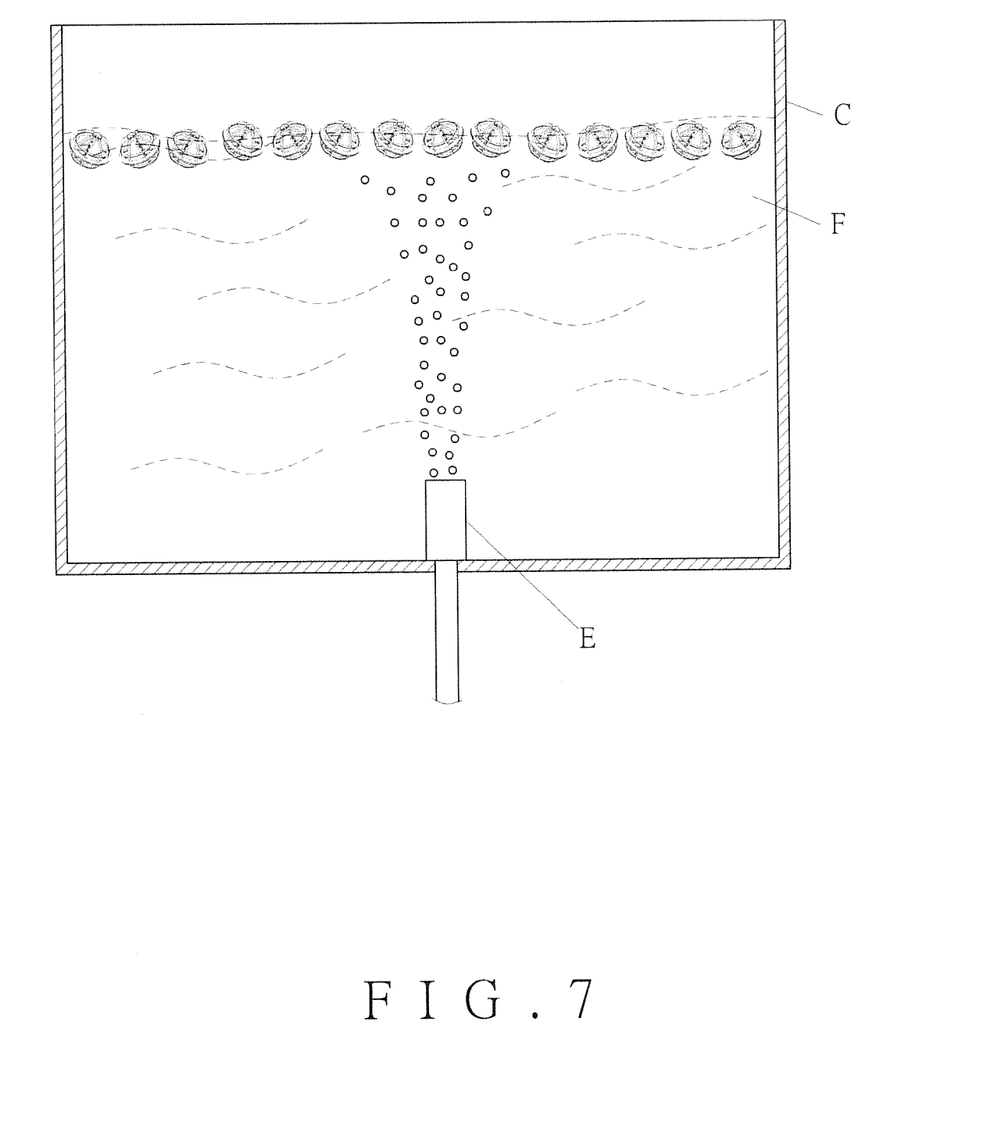
FIG. 7 illustrates a third instance where the biochemical balls of the present invention are used in a filter tank.

The disclosed biochemical balls can be placed in a filter tank (C) (as shown in FIG. 7) so that they float on the water. The filter tank (C) is also equipped with an air stone (E) that produces a large amount of air bubbles, so that the biochemical balls can adequately contact air bubbles throughout the sewage (F) in the filter tank (C). This also helps to increase dissolved oxygen in the sewage (F), thereby improving decomposing efficiency and growth of the nitrifying bacteria. In this manner, filtration of aquafarming systems and processing systems for the sewage (F) can be significantly improved.

Figure 8:
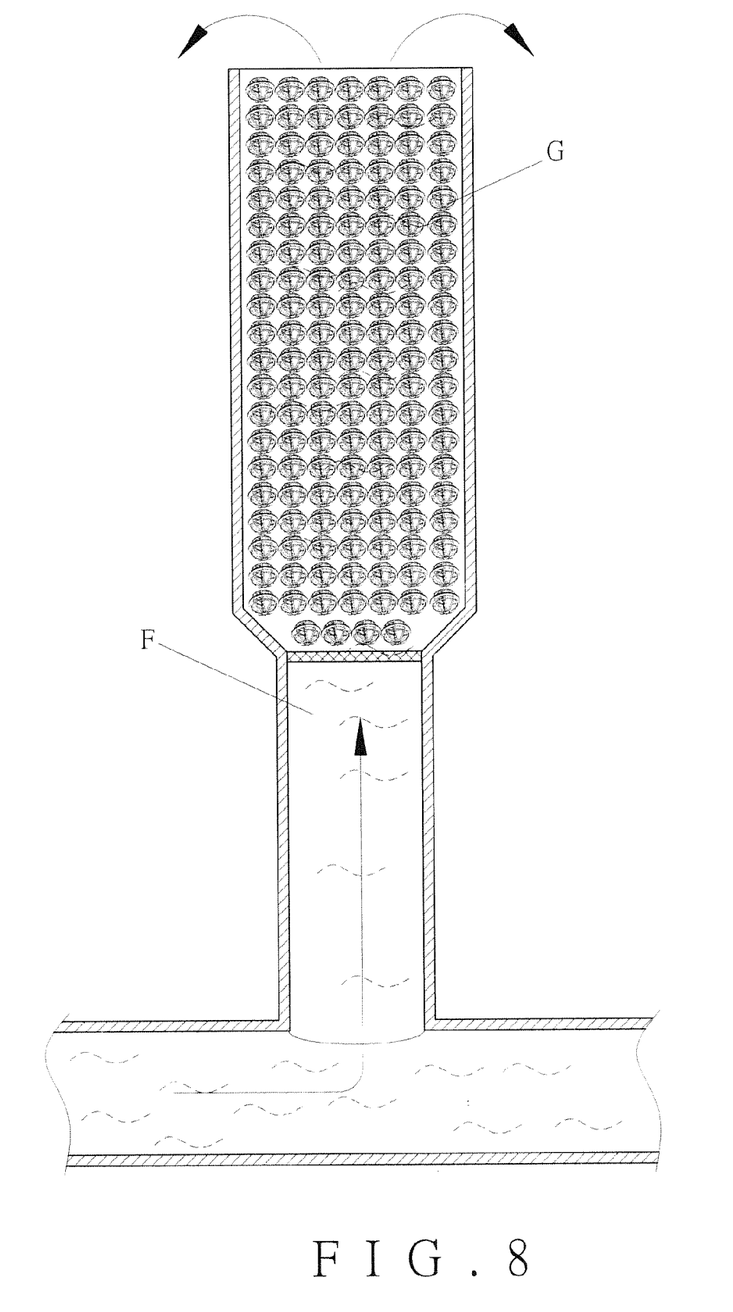
FIG. 8 illustrates a fourth instance where the biochemical balls of the present invention are used in a filter tank.

Alternatively, the biochemical balls may be placed into a closed denitrification filter tank (G) (as shown in FIG. 8), such that the filter tank (G) is filled by the biochemical balls. Denitrifying bacteria are cultured in the biochemical balls, and the sewage (F) is pressured to pass through the biochemical balls with increased strength, and contacts with the denitrifying bacteria cultured in the biochemical balls. As a result, nitrate in the sewage (F) performs denitrification with the denitrifying bacteria, so as to achieve effectively.

Figure 9:
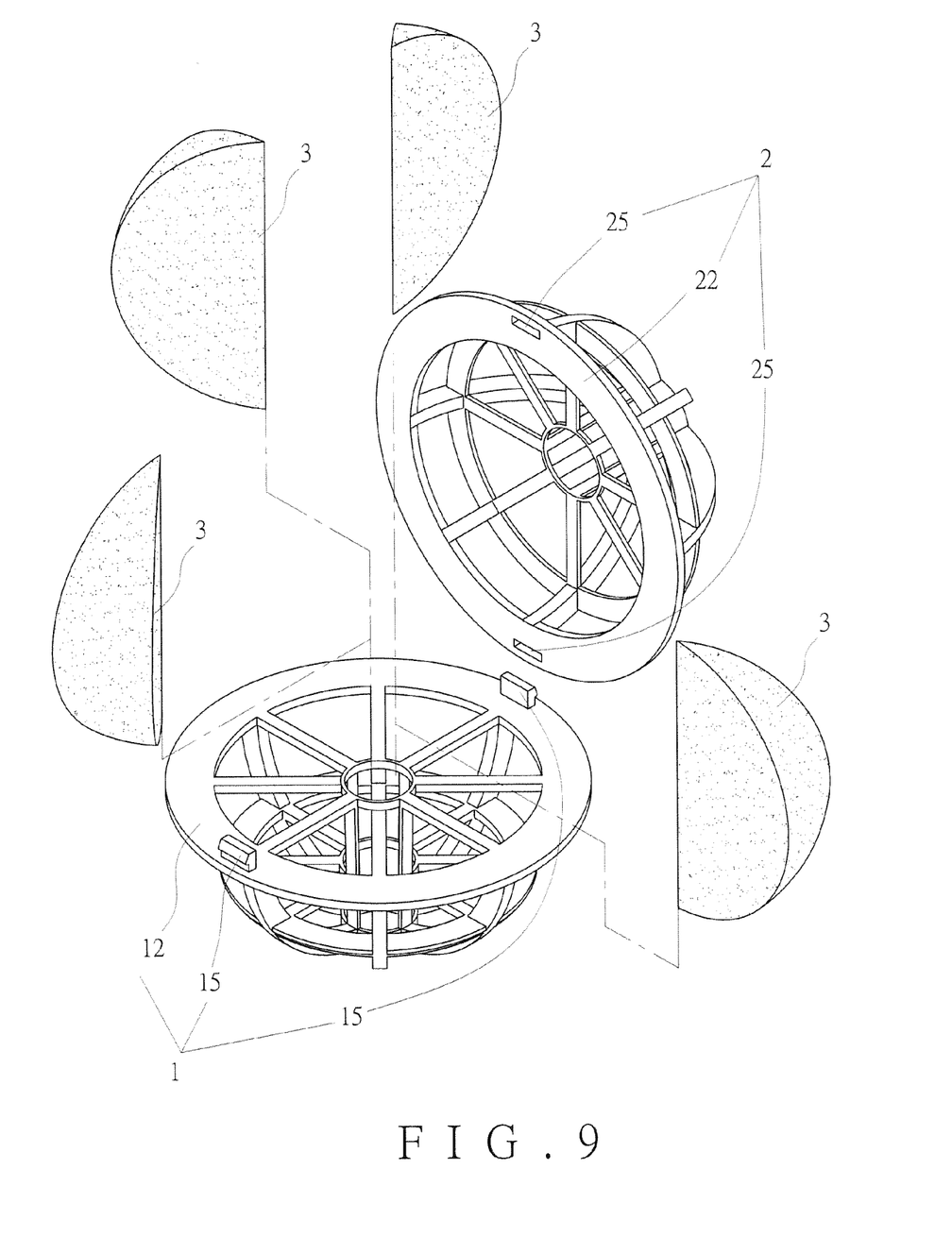
FIG. 9 is an exploded view of a biochemical ball according to another embodiment of the present invention.

In another embodiment of the present invention, as shown in FIG. 9, the first rim (12) of the first half (1) has two opposite first fasteners (15), and the second rim (22) of the second half (2) has two second fasteners (25) that are configured to positionally correspond to and engage with the two first fasteners (15), respectively. When the two first fasteners (15) of the first half (1) engage with the two second fasteners (25) of the second half (2), the first half (1) and the second half (2) together with the sponge filters (3) therein are assembled into a fully spherical biochemical ball. The first half (1) and the second half (2) such assembled can be easily disassembled to allow convenient replacement of the sponge filters (3).

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A biochemical ball, comprising:
a first half, being defined by spherically a plurality of first ribs and peripherally a first rim and having a first partition that divides the first half into a plurality of equal first accommodating spaces, in which the first rim of the first half is provided with at least one first fastener;
a second half, configured to be assembled with the first half, the second half being defined by spherically a plurality of second ribs and peripherally a second rim and having a second partition that divides the second half into a plurality of equal second accommodating spaces, in which the second rim of the second half is provided with at least one second fastener that is configured to correspondingly engage with the at least one first fastener; and
a plurality of sponge filters, being such installed in the first and second accommodating spaces that the first and second accommodating spaces are occupied by the sponge filters in an alternate manner, thereby keeping the sponge filters from being adjacent to and contacting each other.

2. The biochemical ball of claim 1, wherein the first ribs are radially arranged so as to define the first half as a hollow hemisphere.

3. The biochemical ball of claim 1, wherein the second ribs are radially arranged so as to define the second half as a hollow hemisphere.

4. The biochemical ball of claim 1, wherein the first partition has an asterisk-like shape.

5. The biochemical ball of claim 1, wherein the second partition has an asterisk-like structure.

6. The biochemical ball of claim 1, wherein the first half and the second half are made of plastic through injection molding and integratedly formed as a unity.

7. The biochemical ball of claim 1, wherein the first partition is formed on the first rim.

8. The biochemical ball of claim 1, wherein the second partition is formed on the second half close to the second rim.

9. The biochemical ball of claim 1, wherein each of the sponge filters has a bar-like structure that fits in the corresponding first or second accommodating space.

10. The biochemical ball of claim 1, further comprising a connecting joint on the first rim of the first half for connecting the second half.

11. The biochemical ball of claim 1, wherein the first half is centrally provided with a first through hole.

12. The biochemical ball of claim 1, wherein the second half is centrally provided with a second through hole.

* * * * *